United States Patent [19]

Gordon et al.

[11] Patent Number: 5,186,047
[45] Date of Patent: * Feb. 16, 1993

[54] COMBINED ELECTRONIC CLINICAL THERMOMETER AND PACIFIER

[76] Inventors: Michael D. Gordon, 2643 7th St., Apt. A, Santa Monica, Calif. 90405; Darryl D. Massey, 1148 10th St., Manhatten Beach, Calif. 90266

[*] Notice: The portion of the term of this patent subsequent to Feb. 25, 1992 has been disclaimed.

[21] Appl. No.: 697,305

[22] Filed: May 7, 1991

Related U.S. Application Data

[63] Continuation-in-part of Ser. No. 442,845, Jan. 4, 1990, Pat. No. 5,013,160.

[51] Int. Cl.$^5$ .................. G01K 7/14; G01K 13/00
[52] U.S. Cl. ............................ 73/151; 128/736
[58] Field of Search ............... 374/151, 163; 128/736, 128/234; 215/11.2

[56] References Cited

U.S. PATENT DOCUMENTS

| | | | |
|---|---|---|---|
| 4,072,054 | 2/1978 | Blouin | 374/151 |
| 4,265,117 | 5/1981 | Thoma et al. | 374/165 X |
| 4,321,827 | 3/1982 | Anderson | 374/165 X |
| 4,560,973 | 12/1985 | Grimm et al. | 374/165 X |
| 4,762,429 | 8/1988 | Fujikawa | 374/163 |
| 4,813,790 | 3/1989 | Frankel et al. | 374/208 |
| 5,013,160 | 5/1991 | Massey et al. | 374/151 |
| 5,021,060 | 6/1991 | Lu | 374/151 X |
| 5,033,864 | 7/1991 | Lasecki et al. | 128/736 X |
| 5,108,423 | 4/1992 | Lu | 374/151 X |

FOREIGN PATENT DOCUMENTS 39434 4/1981 Japan .................. 374/151

Primary Examiner—Daniel M. Yasich
Attorney, Agent, or Firm—W. Edward Johansen

[57] ABSTRACT

A combined electronic clinical thermometer and pacifier includes a housing, an integral mouth-piece, a temperature sensitive element which has a transducer and a pair of wire leads, a circuit board which is disposed within the housing, a temperature oscillating circuit, a body temperature measuring circuit and a digital display device. The integral mouth-piece has a stop ring flange portion and a flexible nipple portion in which the transducer is disposed so that the combined electronic clinical thermometer and pacifier can easily and safely take the temperature of either an infant or a small child. The housing has a front face and is mechanically coupled to the stop ring flange portion. When the flexible nipple portion is inserted into the mouth the transducer detects a body temperature. The temperature oscillating circuit is electrically coupled to the pair of wire leads of the temperature sensitive element and is disposed on the circuit board. The body temperature measuring circuit is electrically coupled to the temperature oscillating circuit and is disposed on the circuit board. The digital display device is electrically coupled to the body temperature measuring circuit and is disposed on the circuit board. The temperature sensitive element has a sensing button. The flexible nipple portion of the integral mouth-piece has an outer sidewall and an inner sidewall with an opening in order to allow the sensing button, which is disposed in the opening, to be adjacent and contiguous to the outer sidewall.

1 Claim, 2 Drawing Sheets

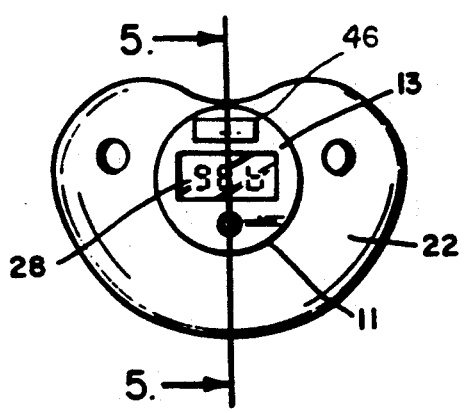
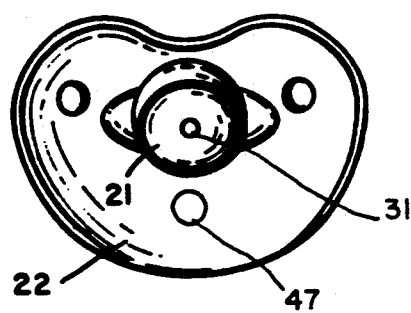
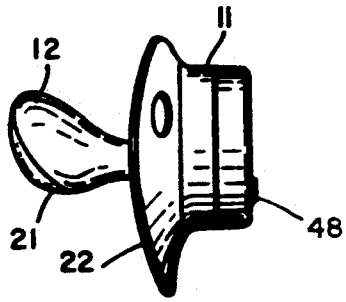
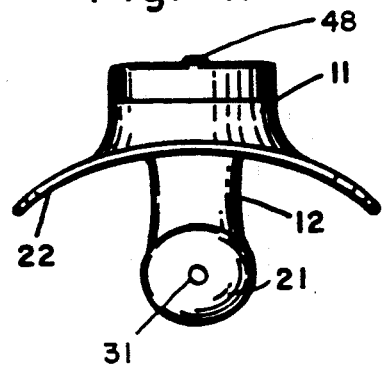
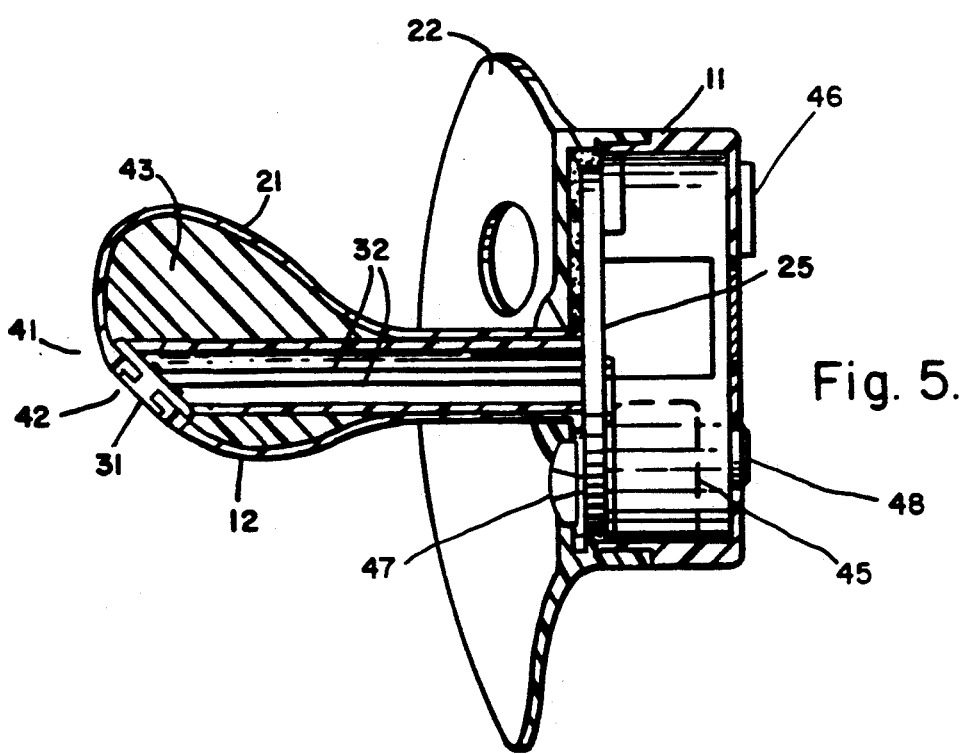

COMBINED ELECTRONIC CLINICAL THERMOMETER AND PACIFIER

This application is a continuation-in-part of the application filed Jan. 4, 1990 under Ser. No. 442,845, now U.S. Pat. No. 5,013,160.

BACKGROUND OF THE INVENTION

1. Field of the Invention

The present invention relates to a thermometer and more particularly to an electronic thermometer which is combined with a pacifier for easily and safely taking the oral temperature of either an infant or a small child.

2. Description of the Prior Art

U.S. Pat. No. 4,762,429, entitled Electronic Clinical Thermometer with a Battery Life Warning Display, issued to Toyoharu Fujikawa on Aug. 9, 1988, teaches an electronic clinical thermometer which includes a temperature oscillating circuit having a temperature sensor for detecting the body temperature, a body temperature measuring circuit for making data on the body temperature in response to an output signal of the temperature oscillating circuit; a digital display device having seven-segment digital patterns for displaying the body temperature in response to a signal of the body temperature measuring circuit; and a battery voltage detecting circuit for detecting a voltage drop of a battery, a first additional pattern and a second additional pattern are provided between two adjacent digital patterns of the digital display device and also an additional pattern decoder for driving the first and second additional patterns is provided, and the additional pattern decoder and decoders provided for driving the two digital patterns are controlled by an output signal of the battery voltage detecting circuit, whereby a battery life warning mark having the shape of the battery is displayed on the digital display device.

U.S. Pat. No. 4,813,790, entitled Mouth Grips for Oral Thermometers, issued to Steven T. Frankel and Calvin W. Wingo on Mar. 21, 1989, teaches an electronic thermometer which includes a mouth-piece, a housing which is attached to the mouth-piece, a temperature sensitive element, an electrical circuit and a temperature display. The electronic thermometer orally measures the temperature of a living being. The mouth-piece is for insertion into the mouth of the living being. The temperature sensitive element has a metallic element and a pair of wire leads and effectively transforms a temperature inside the mouth to an analog signal correlating to the temperature. The electrical circuit is electrically coupled to the temperature sensitive element and converts the analog signal to a digital signal. The electrical circuit is electrically coupled to the pair of wire leads of the temperature sensing element and is disposed within the housing. The temperature display a digital signal display in a digital read-out format. is disposed on the mouth-piece.

U.S. Pat. No. 4,072,054, entitled Combined Pacifying Nipple and Mouth Thermometer Device, issued to Michel Blouin and Leo Mercier on Feb. 7, 1978, teaches a combined pacifying device and mouth thermometer which includes a liquid mercury thermometer tube, a flexible nipple mouth-piece and a stop ring.

U.S. Pat. No. 3,968,690, entitled Combined Infant Pacifier and Thermometer, issued to Michel Blouin and Leo Mercier on Jul. 13, 1976, teaches a combined infant pacifier and mouth thermometer which includes a liquid thermometer tube, a flexible nipple mouth-piece and a stop ring. The liquid thermometer tube has a liquid bulb portion which has an inner open end and an outer closed end, a temperature display portion which is joined to the inner opend end of the liquid bulb portion along the liquid thermometer tube. The flexible nipple mouth-piece freely surrounds the outer end of the liquid bulb portion and has apertures therethrough placing the bulb portion in open communcation with the exterior of the mouthpiece. The stop ring is secured over the liquid temperature tube at the junction between the bulb portion and the temperature display portion.

U.S. Pat. No. 3,117,450, entitled Thermometer Pacifier, issued to Thomas E. Hoy on Jan. 14, 1964, teaches thermometer pacifier which includes a pacifier and a mercury thermometer which is associated with the pacifier so that the temperature of a small child may be taken without difficulty. The pacifier includes a framing tube and a hollow bulbous portion in the shape of a nursing nipple with an aperture at its outer end and an enlarged flange at its base end.

U.S. Pat. No. D-268,651, entitled Infant Thermometer, issued to Barbara Doyle on Apr. 19, 1983, teaches an ornamental design for an infant thermometer.

U.S. Pat. No. 3,913,402, entitled Thermometer Pacifier, issued to Barbara Doyle on Oct. 21, 1975, teaches a thermometer in combination with a pacifier for use in ascertaining the temperature of a child. The pacifier includes a rubber nipple and a circular stop flange which are made of one piece and of a flexible material such as a high grade gum rubber. The rubber nipple is of the size and shape usually associated with a child's pacifier and surrounds the well of the thermometer. The pacifier also includes a transparent rigid tubular member which encloses the glass stem of the thermometer so that a child cannot break the glass stem. The transparent rigid tubular member is inserted into the rubber nipple and the circular stop flange and may be removed so the rubber nipple and the circular stop flange may be sterilized.

U.S. Pat. No. 4,619,271, entitled Electronic Thermometer with Probe Isolation Chamber, issued to Laurie J. Burger, Joel N. Helfer, Donald E. Protzmann and Robert F. Uhl on Oct. 28, 1986, teaches an electronic thermometer which includes a color coded probe permanently fastened by an electrical cable to a color coded isolation chamber in order to prevent indavertent use of a rectal probe with an oral isolation chamber. Red and blue isolation chambers are used for oral and rectal temperature, respectively and can be readily used with one thermometer housing.

SUMMARY OF THE INVENTION

In view of the foregoing factors and conditions which are characteristic of the prior art it is the primary object of the present invention to provide an electronic thermometer which is combined with a pacifier for easily and safely taking the oral temperature of either an infant or a small child.

In accordance with an embodiment of the present invention a combined electronic clinical thermometer and pacifier is described. The combined electronic clinical thermometer and pacifier includes a housing, an integral mouth-piece, a temperature sensitive element which has a transducer and a pair of wire leads, a circuit board which is disposed within the housing, a temperature oscillating circuit, a body temperature measuring circuit and a digital display device. The integral mouthpiece has a stop ring flange portion and a flexible nipple portion in which the transducer is disposed so that the combined electronic clinical thermometer and pacifier can easily and safely take the temperature of either an infant or a small child. The housing has a front face and is mechanically coupled to the stop ring flange portion. When the flexible nipple portion is inserted into the mouth the transducer detects a body temperature. The temperature oscillating circuit is electrically coupled to the pair of wire leads of the temperature sensitive element and is disposed on the circuit board. The body temperature measuring circuit is electrically coupled to the temperature oscillating circuit and is disposed on the circuit board. The digital display device is electrically coupled to the body temperature measuring circuit and is disposed on the circuit board. The temperature sensitive element has a sensing button. The flexible nipple portion of the integral mouth-piece has an outer sidewall and an inner sidewall with an opening in order to allow the sensing button, which is disposed in the opening, to be adjacent and contiguous to the outer sidewall.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a front elevational view of a combined electronic clinical thermometer and pacifier which includes a housing with front face and a digital display device which is disposed on the front face of the housing and which has been made in accordance with the principles of the present invention.

FIG. 2 is a rear elevational view of the combined electronic clinical thermometer and pacifier of FIG. 1 which also includes an integral mouth-piece with a flexible nipple portion and a stop ring flange portion which is mechanically coupled to the housing.

FIG. 3 is a side elevational view of the combined electronic clinical thermometer and pacifier of FIG. 1.

FIG. 4 is a bottom plan view of the combined electronic clinical thermometer and pacifier of FIG. 1.

FIG. 5 is a side elevational view in cross-section of the combined electronic clinical thermometer and pacifier of FIG. 1 taken along line 5—5 of FIG. 1.

DESCRIPTION OF THE PREFERRED EMBODIMENT

Figure 6:
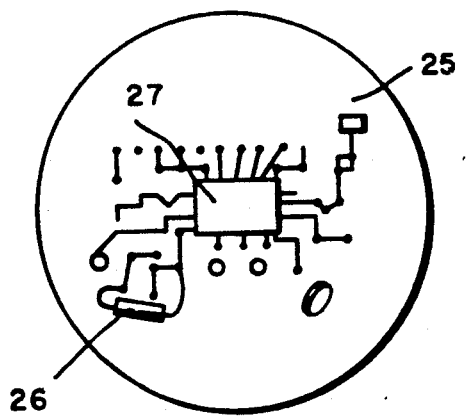
FIG. 6 is a top plan view of a circuit board which includes a temperature oscillating circuit and a body temperature measuring circuit and which is disposed in the housing of the combined electronic clinical thermometer an pacifier of FIG. 1.

In order to best understand the present invention it is necessary to refer to the following description of its preferred embodiment in conjunction with the accompanying drawing. Referring to FIG. 1 in conjunction with FIGS. 2, 3 and 4 a combined electronic clinical thermometer and pacifier 10 includes a housing 11 and an integral mouth-piece 12. The housing 11 has a front face 13. The integral mouth-piece 12 has a flexible nipple portion 21 and a stop ring flange portion 22 which is mechanically coupled to the housing 11.

Figure 7:
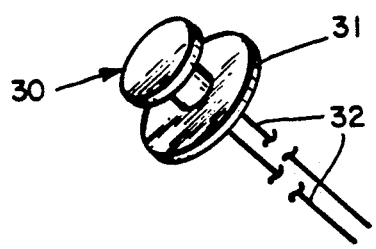
FIG. 7 is a perspective drawing of a temperature sensitive element which includes a metallic element and a pair of wire leads which are electrically coupled to the temperature oscillating circuit and which is disposed in the flexible nipple of the integral mouth-piece of the combined electronic clinical thermometer and pacifier of FIG. 1.
Figure 8:
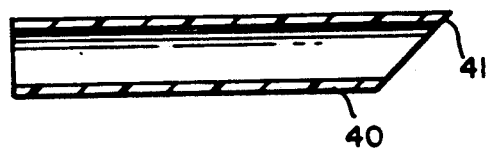
FIG. 8 is a longitudinal view in cross-section of a tubular member.
Figure 9:
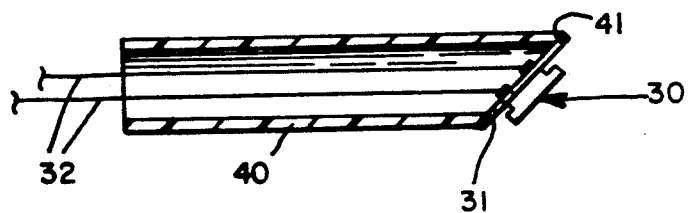
FIG. 9 is a longitudinal view in cross-section of the tubular member of FIG. 8 into which the pair of wire leads of the temperature sensing element of FIG. 7 are inserted.
Figure 10:
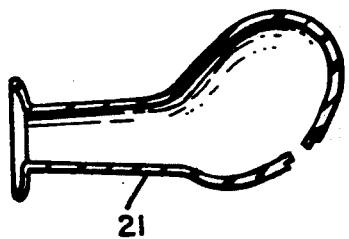
FIG. 10 is a longitudinal view in cross-section of the integral mouth-piece of the combined electronic clinical thermometer and pacifier of FIG. 1.
Figure 11:
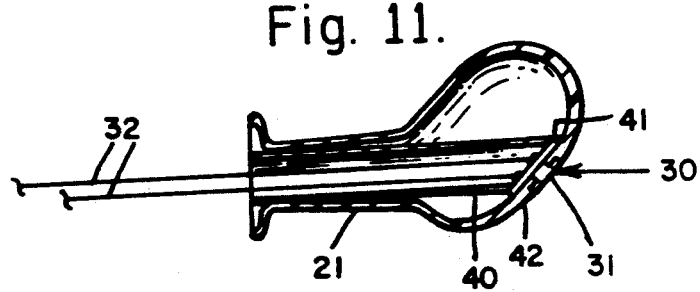
FIG. 11 is a longitudinal view in cross-section of the tubular member of FIG. 9 in which the pair of wire leads of the temperature sensing element of FIG. 7 have been inserted and the integral mouth-piece of the combined electronic clinical thermometer and pacifier of FIG. 1 in which the tubular member of FIG. 9 has been inserted.

Referring to FIG. 5 in conjunction with FIGS. 6 and 7 the combined electronic clinical thermometer and pacifier 10 also includes a circuit board 25, a temperature oscillating circuit 26, a body temperature measuring circuit 27, a digital display device 28 and a temperature sensitive element 30. The circuit board 25 is disposed within the housing 11. The temperature sensitive element 30 which has a transducer 31 and a pair of wire leads 32. The temperature sensitive element 30 also has a sensing button 33. The flexible nipple portion 21 of the integral mouth-piece 12 has an outer sidewall and an inner sidewall with an opening 34 in order to allow the sensing button 33, which is disposed in the opening 34, to be adjacent and contiguous to the outer sidewall. The transducer 31 is disposed in the flexible nipple portion 21 of the integral mouth-piece 12 so that the combined electronic clinical thermometer and pacifier 10 can easily and safely take the temperature of either an infant or a small child. When the flexible nipple portion 21 is inserted into the mouth the transducer 31 detects a body temperature. The temperature oscillating circuit 26 is electrically coupled to the pair of wire leads 32 of the temperature sensitive element 30 and is disposed on the circuit board 25. The body temperature measuring circuit 27 is electrically coupled to the temperature oscillating circuit 26 and is disposed on the circuit board 25. The digital display device 28 is electrically coupled to the body temperature measuring circuit 27 and is disposed on the circuit board 25.

Referring to FIG. 5 in conjunction with FIGS. 8, 9, 10 and 11 the combined electronic clinical thermometer and pacifier 10 may also include a tubular member 40 with a truncated end 41. The pair of wire leads 32 of the temperature sensitive element 30 are inserted into the tubular member 40 so that the transducer 31 is contiguous to its truncated end 41. The tubular member 40 is inserted into the flexible nipple portion 21 of the integral mouth-piece 12 of the combined electronic clinical thermometer and pacifier 10 so that the transducer 31 contacts the inner sidewall of the flexible nipple portion 21 of the integral mouth-piece 12 as close as possible. The nipple portion 21 of the integral mouth-piece 12 may be filled with silicone 43 which would surround the tubular member 40 in order to provide resistance to the child's chewing on the flexible nipple portion 21 of the integral mouth-piece 12.

Referring again to FIG. 5 in conjunction with FIGS. 1, 2, 3 and 4 the combined electronic clinical thermometer and pacifier 10 may further include a solar battery with a solar-battery charging system, a thermally or optically activating switch 47, a reset button 48 or a memory recall button, an alarm 43 when the child's temperature exceeds a normal temperature and a digital clock in order to determine the time at which the child's temperature is being taken.

From the foregoing it can be seen that a combined electronic clinical thermometer and pacifier has been described. It should be noted that the sketches are not drawn to scale and that distance of and between the figures are not to be considered significant.

What is claimed is:

1. A combined electronic clinical thermometer and pacifier comprising:
   a. a housing;
   b. an integral mouth-piece including an outer sidewall and an inner sidewall with an opening adjacent and contiguous to said outer sidewall and having a flexible nipple portion and a stop ring flange portion coupled to said housing;
   c. a temperature sensitive element having a transducer, said transducer being disposed in said opening of said flexible nipple;
   d. a circuit board which is mounted within said housing and secured to an outer part of the stop ring flange portion;
   e. a temperature oscillating circuit is electrically coupled to said temperature sensitive element and is disposed on said circuit board;
   f. a body temperature measuring circuit electrically coupled to said temperature oscillating circuit and disposed on said circuit board, said circuits mounted on an inner part of the stop ring flange portion; and
   g. a digital display device electrically coupled to said body temperature measuring circuit and disposed on said circuit board.

* * * * *